(12) United States Patent
Chen et al.

(10) Patent No.: US 12,313,865 B2
(45) Date of Patent: May 27, 2025

(54) PRODUCTION PROCESS OF QUANTUM DOT LIGHT DIFFUSION PLATE CAPABLE OF BLOCKING HARMFUL BLUE LIGHT

(71) Applicant: GUANGDONG ODIMING OPTOELECTRONICS TECHNOLOGY CO., LTD, Zhaoqing (CN)

(72) Inventors: Jinquan Chen, Zhaoqing (CN); Daoqing Zhou, Zhaoqing (CN)

(73) Assignee: GUANGDONG ODIMING OPTOELECTRONICS TECHNOLOGY CO., LTD, Zhaoqing (CN)

( * ) Notice: Subject to any disclaimer, the term of this patent is extended or adjusted under 35 U.S.C. 154(b) by 0 days.

(21) Appl. No.: 18/759,806

(22) Filed: Jun. 29, 2024

(65) Prior Publication Data

US 2024/0353598 A1 Oct. 24, 2024

Related U.S. Application Data

(63) Continuation of application No. PCT/CN2022/127268, filed on Oct. 25, 2022.

(30) Foreign Application Priority Data

Dec. 30, 2021 (CN) .......................... 202111650652.6

(51) Int. Cl.
G02B 5/02 (2006.01)
(52) U.S. Cl.
CPC ......... G02B 5/0242 (2013.01); G02B 5/0268 (2013.01); G02B 5/0294 (2013.01)

(58) Field of Classification Search
CPC ... G02B 5/0242; G02B 5/0294; G02B 5/0268
See application file for complete search history.

(56) References Cited

U.S. PATENT DOCUMENTS 9,548,009 B2 1/2017 Pickett et al.
11,795,392 B2 10/2023 Yang et al.
11,903,228 B2 2/2024 Won et al.

FOREIGN PATENT DOCUMENTS

CN 102107175 A 6/2011
CN 103447193 A 12/2013
(Continued)

OTHER PUBLICATIONS

Internation Search Report of PCT/CN2022/127268, Mailed Jan. 19, 2023.

*Primary Examiner* — Mathieu D Vargot

(57) ABSTRACT

A production process of a quantum dot light diffusion plate capable of blocking harmful blue light, including the following steps: preparing a quantum dot coating solution (S1); coating the quantum dot coating solution on a surface of a light diffusion plate by an automatic coating machine, and allowing spontaneous crystallization of the quantum dot coating solution to form a light diffusion layer (S2); sintering the light diffusion layer to obtain a quantum dot light diffusion plate (S3); jet-printing an anti-blue light layer on a surface of the quantum dot light diffusion plate by an air jet printing machine (S4); and conducting cooling and cutting to obtain the quantum dot light diffusion plate capable of blocking the harmful blue light (S5). A device for producing the quantum dot light diffusion plate includes a crystalline production structure (1), a sintering structure (2), and a jet-printing structure (3).

10 Claims, 11 Drawing Sheets

(56) References Cited

FOREIGN PATENT DOCUMENTS

| | | | |
|---|---|---|---|
| CN | 108387957 | * | 8/2018 |
| CN | 108387957 A | | 8/2018 |
| CN | 108646327 A | | 10/2018 |
| CN | 113493660 A | | 10/2021 |
| CN | 114236657 A | | 3/2022 |
| JP | H11342470 A | | 12/1999 |

* cited by examiner

S1, add fumed silica particles, titanium dioxide particles, and large-particle-size silica particles to an adhesive, stir at a high speed for 20 min to 30 min to obtain a particle-predispersed solution, add red and green quantum dots to the particle-predispersed solution, and stir at a high speed for 20 min to 30 min to obtain a quantum dot coating solution

S2, coat the quantum dot coating solution on a surface of a light diffusion plate by an automatic coating machine, and allowing spontaneous crystallization of the quantum dot coating solution to form a light diffusion layer

S3, sinter the light diffusion layer to obtain a quantum dot light diffusion plate

S4, jet-print an anti-blue light layer on a surface of the quantum dot light diffusion plate by an air jet printing machine

S5, after the jet-printing is completed, cool and cut the second intermediate quantum dot light diffusion plate to obtain a product

FIG. 1

PRODUCTION PROCESS OF QUANTUM DOT LIGHT DIFFUSION PLATE CAPABLE OF BLOCKING HARMFUL BLUE LIGHT

CROSS-REFERENCE TO RELATED APPLICATION

This application is a continuation of International Patent Application No. PCT/CN2022/127268 with a filing date of Oct. 25, 2022, designating the United States, now pending, and further claims priority to Patent Application No. 202111650652.6 with a filing date of Dec. 30, 2021. The content of the aforementioned applications, including any intervening amendments thereto, is incorporated herein by reference.

TECHNICAL FIELD

The present disclosure relates to the technical field of production of light diffusion plates, and specifically to a production process of a quantum dot light diffusion plate capable of blocking harmful blue light.

BACKGROUND

Light diffusion plates are widely used in liquid crystal display, light-emitting diode (LED) lighting, and imaging display systems. The light diffusion plate is designed to make incident light fully scattered to allow a gentle uniform illumination effect. For direct backlight systems of liquid-crystal display televisions, the light diffusion plate need to have heat resistance, dimensional stability, excellent shading, and durability, such that light diffusion effects of the light diffusion plates reach the optimal state and are most suitable for direct backlight units. Direct light systems of LED lighting do not require the large diffusion of light, and merely require the change of a visual effect. If a microstructure diffusion plate used for a backlight module is adopted for the direct light systems of LED lighting, a light source will undergo a color shift. Direct light systems used for imaging display systems need to meet the same requirements as the direct light systems of lighting, but need to meet advanced requirements for the light transmittance and color shift.

SUMMARY OF PRESENT INVENTION

The utility model CN201220223313.X discloses a light guide and diffusion plate and an LED planar light source with the light guide and diffusion plate. The light guide and diffusion plate of this utility model is produced through the simultaneous co-extrusion of the traditional diffusion plate and light guide plate by a double-layer co-extrusion process, and includes a diffusion layer and a light guide layer that are integrally formed. The LED planar light source of this utility model includes a reflecting plate, an LED light source, and the light guide and diffusion plate of this utility model. Since the light guide and diffusion plate of this utility model is produced through the integrated formation of the diffusion layer and the light guide layer by the double-layer co-extrusion process, this utility model simplifies both a material forming process and the follow-up assembly process, shortens a production time, and improves a production efficiency, thereby reducing a cost. However, this utility model is not conducive to the crystallization-sintering-jet printing integrated production.

The patent application CN201721382201.8 discloses an automatic light diffusion plate cross-cutting apparatus, including: a cross-cutting knife, a cross-cutting knife-moving track, a controllable traction device, and a mobile conveying platform. The controllable traction device is configured to pull a light diffusion plate to move forward or stop. When the controllable traction device pulls the light diffusion plate to move forward, the cross-cutting knife is located at a side of the cross-cutting knife-moving track. When the controllable traction device stops to pull the light diffusion plate to move forward, the cross-cutting knife moves from one side of the cross-cutting knife-moving track to the other side of the cross-cutting knife-moving track at a constant speed, and a cutting edge of the cross-cutting knife is inserted into the light diffusion plate and moves from one side of the light diffusion plate to the other side of the light diffusion plate. When the controllable traction device begins to pull the light diffusion plate to further move forward, a cut light diffusion plate will be transferred to the mobile conveying platform under an action of a traction force of the controllable traction device, where the light diffusion plate is not in direct contact with the mobile conveying platform, but has a specified spatial distance from the mobile conveying platform. However, this patent is not conducive to continuous production.

The utility model CN201920223355.5 discloses a brightness-enhancing light diffusion plate structure, including a main light diffusion plate. A groove is formed inside the main light diffusion plate, and light scattering particles are filled inside the groove. Upper and lower surfaces of a top of the main light diffusion plate each are fixedly connected to a connecting member, and a secondary light diffusion plate is movably connected between surfaces of the two connecting members. A stepped groove is formed on a surface of the secondary light diffusion plate, and an inner surface of the stepped groove is in threaded connection with bolts. This utility model relates to the technical field of light diffusion plate structures. In the brightness-enhancing light diffusion plate structure, light is scattered with the light scattering particles inside the main light diffusion plate and gathered through a convex, which can effectively enhance a light scattering brightness in combination with the secondary light diffusion plate. In addition, through a wear-resistant layer and a water-proof layer, damage phenomena such as scratching can be avoided during processing and handling, and the water resistance can be enhanced. The secondary light diffusion plate can be disassembled and replaced through the bolts, which is convenient to use. However, this utility model is not conducive to detailed control.

There are some deficiencies in the use of the traditional production devices for light diffusion plates. For example, when the traditional production devices are adopted, it may be not conducive to crystallization-sintering-jet printing integrated production, may be not convenient to continuous production, may be not conducive to detailed control, or may be not conducive to a specific jet printing work. Through the research funded by the fourth batch of Xijiang Innovation Team Projects in Zhaoqing City, a technical solution of a production device for a quantum dot light diffusion plate capable of blocking harmful blue light is proposed to solve the above problems.

An objective of the present disclosure is to provide a production process of a quantum dot light diffusion plate capable of blocking harmful blue light, so as to solve the problems mentioned in the above background.

In order to allow the above objective, the present disclosure provides the following technical solutions:

A quantum dot light diffusion plate capable of blocking harmful blue light is provided, and a production process of the quantum dot light diffusion plate includes the following steps:

S1, adding fumed silica particles, titanium dioxide particles, and large-particle-size silica particles to an adhesive, stirring at a high speed for 20 min to 30 min to obtain a particle-predispersed solution, adding red and green quantum dots to the particle-predispersed solution, and stirring at a high speed for 20 min to 30 min to obtain a quantum dot coating solution;

S2, coating the quantum dot coating solution on a surface of a light diffusion plate by an automatic coating machine, and allowing spontaneous crystallization of the quantum dot coating solution to form a light diffusion layer;

S3, sintering the light diffusion layer to obtain a quantum dot light diffusion plate.

S4, jet-printing an anti-blue light layer on a surface of the quantum dot light diffusion plate by an air jet printing machine; and S5, after the jet-printing is completed, conducting cooling and cutting to obtain the quantum dot light diffusion plate capable of blocking the harmful blue light.

A production device of the quantum dot light diffusion plate capable of blocking the harmful blue light is provided, including a crystalline production structure, a sintering structure, and a jet-printing structure. A side edge of the crystalline production structure communicates with the sintering structure, and a side edge of the sintering structure communicates with the jet-printing structure.

The crystalline production structure includes a bottom support frame, a spring buffer frame, a hinge connection rod, a fixation-connection bracket, a first conveying bed-plate frame, a coating rolling rod, an electric motor, and a fixation-support frame.

The bottom support frame is arranged at an inner bottom of the crystalline production structure, a top of the bottom support frame is fixedly connected to the first conveying bed-plate frame, a side edge of the first conveying bed-plate frame is fixedly connected to the spring buffer frame, a side edge of the spring buffer frame is fixedly connected to the hinge connection rod, a side edge of the hinge connection rod is fixedly connected to the fixation-connection bracket, the electric motor is arranged at a lower side edge of the fixation-connection bracket, a side edge of the electric motor is fixedly connected to the coating rolling rod, and the fixation-support frame is fixedly connected to a bottom of the fixation-connection bracket.

The crystalline production structure includes a communicating groove pipe frame and a side vertical hinge frame.

The communicating groove pipe frame is arranged at an inner center of the crystalline production structure, and a side edge of the communicating groove pipe frame is fixedly connected to the side vertical hinge frame.

The sintering structure includes a first electrical communicating frame, a second electrical communicating frame, a first protective insulating frame, a first electric heat-connecting seat, and a sintering plate frame.

The first electrical communicating frame is arranged at an inner top of the sintering structure, a center of the first electrical communicating frame communicates with the second electrical communicating frame, a bottom of the second electrical communicating frame communicates with the first electric heat-connecting seat, the first protective insulating frame is arranged between the second electrical communicating frame and the first electric heat-connecting seat, and a bottom of the first electric heat-connecting seat is fixedly connected to the sintering plate frame.

The sintering structure further includes a second electric heat-connecting seat, a second protective insulating frame, a third electrical communicating frame, and a fourth electrical communicating frame. The fourth electrical communicating frame is arranged at an inner bottom of the sintering structure, a center of the fourth electrical communicating frame communicates with the third electrical communicating frame, a top of the third electrical communicating frame communicates with the second electric heat-connecting seat, and the second protective insulating frame is arranged between the third electrical communicating frame and the second electric heat-connecting seat.

The jet-printing structure includes a communicating nozzle, a matching connecting pipe, and a second conveying bed-plate frame.

The second conveying bed-plate frame is arranged at an inner center of the jet-printing structure, the communicating nozzle is provided on the second conveying bed-plate frame, and a center of the communicating nozzle communicates with the matching connecting pipe.

The jet-printing structure further includes a connecting riser pipe, a spraying nozzle, and a supporting leg plate.

The supporting leg plate is fixedly connected to a bottom of the second conveying bed-plate frame, a bottom of the matching connecting pipe communicates with the connecting riser pipe, and a bottom of the connecting riser pipe communicates with the spraying nozzle.

Preferably, the first electric heat-connecting seat and the second electric heat-connecting seat are arranged symmetrically, and both are fixedly connected to the sintering plate frame.

Preferably, the first electrical communicating frame and the second electrical communicating frame both have an annular structure, and the first electrical communicating frame and the second electrical communicating frame communicate with each other through a central inner cavity.

Preferably, the first conveying bed-plate frame communicates with the sintering plate frame, and the sintering plate frame communicates with the second conveying bed-plate frame.

Preferably, the communicating nozzle communicates with an outside environment, and communicates with the connecting riser pipe and the spraying nozzle through the matching connecting pipe.

Preferably, the communicating groove pipe frame communicates with the outside environment through a bottom position, and a bottom of the communicating groove pipe frame is provided with a mouth body.

Preferably, the electric motor is fixedly connected to the fixation-support frame, and the electric motor is configured to drive the coating rolling rod to be rotatably connected to the fixation-connection bracket.

Preferably, the side edge of the sintering structure is slidably connected to a mobile carriage, a side edge of the mobile carriage is fixedly connected to a fixation-connection member, a side edge of the fixation-connection member is fixedly connected to a matching strut, and a side edge of the matching strut is fixedly connected to a tensile spindle.

Preferably, the anti-blue light layer in the S3 includes the following components in parts by weight: 30 parts to 40 parts of an ultraviolet (UV)-cured polycarbonate, 15 parts to 20 parts of a nano-rare earth oxide, 10 parts to 20 parts of polymethyl methacrylate, 8 parts to 10 parts of n-hexanol, 3 parts to 5 parts of 2,6-di-tert-butyl-4-methylphenol, 6 parts to 8 parts of dimethyl oxalate, and 1 part to 3 parts of zinc oxide.

Beneficial Effects of the Present Disclosure

1. In the present disclosure, a crystalline production structure is provided. The crystalline production structure is produced through the assembly of a bottom support frame, a spring buffer frame, a hinge connection rod, a fixation-connection bracket, a first conveying bed-plate frame, a coating rolling rod, an electric motor, a fixation-support frame, a communicating groove pipe frame, and a side vertical hinge frame. The arrangement of the communicating groove pipe frame facilitates the even coating of a phosphor-containing silica gel solution on a surface of a light diffusion plate. Under a drive of the electric motor, the coating rolling rod can rotate to facilitate the even coating and the subsequent crystallization. The first conveying bed-plate frame communicates with the spring buffer frame and the hinge connection rod, which is convenient to a connection buffer function and a matching connection.

2. In the present disclosure, a sintering structure and a jet-printing structure are provided. The sintering structure is produced through the assembly of a first electrical communicating frame, a second electrical communicating frame, a first protective insulating frame, a first electric heat-connecting seat, a sintering plate frame, a second electric heat-connecting seat, a second protective insulating frame, a third electrical communicating frame, and a fourth electrical communicating frame. The overall heating is allowed through the first electric heat-connecting seat and the second electric heat-connecting seat, which facilitates the internal heating and the successful sinter molding. The arrangement of the jet-printing structure is convenient to an air jet printing work and a surface treatment for a light diffusion plate.

3. In the present disclosure, a mobile carriage, a fixation-connection member, a matching strut, and a tensile spindle are provided. The tensile spindle can be connected to an outside environment and can be stretched through the outside environment to drive the matching strut, the fixation-connection member, and the mobile carriage to move. The mobile carriage is built in the sintering structure at a center position, and can allow the passage of an internal light diffusion plate. In this way, the overall communicated treatment work of the crystalline production structure, the sintering structure, and the jet-printing structure can be allowed.

4. In the present disclosure, quantum dots are added on the basis of a light diffusion plate, which can effectively improve a color gamut and a display effect. In addition, an anti-blue light layer is jet-printed on a surface of a quantum dot light diffusion plate. The anti-blue light layer can absorb most of harmful blue light to greatly reduce the emission of harmful blue light and improve the light stability and light display uniformity, which is suitable for the field of liquid crystal display. The production process of the present disclosure is simple and easy to operate, and has a high production efficiency and a prominent economic benefit.

BRIEF DESCRIPTION OF THE DRAWINGS

In order to describe the technical solutions in the embodiments of the present disclosure clearly, the accompanying drawings required to describe the embodiments are briefly described below. Apparently, the accompanying drawings described below are only some embodiments of the present disclosure. Those of ordinary skill in the art may further obtain other accompanying drawings based on these accompanying drawings without creative efforts.

FIG. 1 is a schematic flow chart of the production process of the present disclosure;

Figure 2:
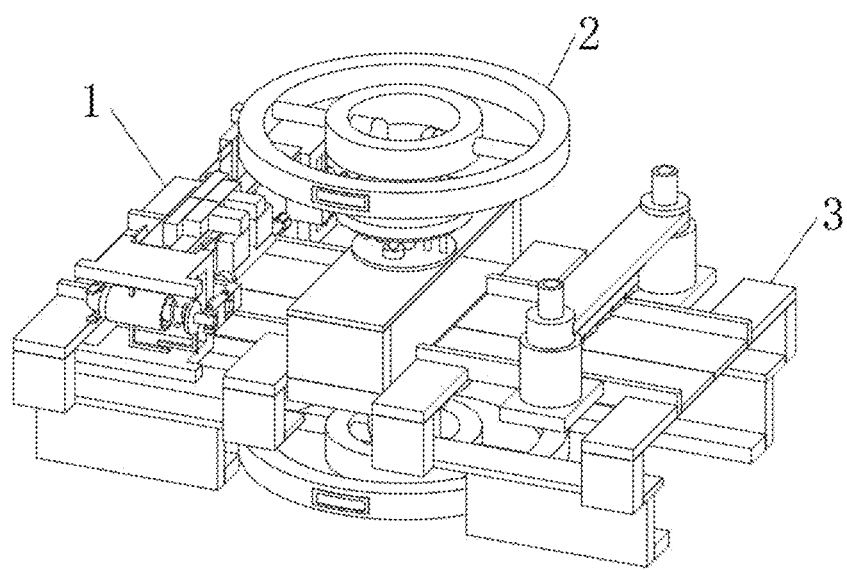
FIG. 2 is a schematic structural diagram of the main body of the present disclosure.

Reference numerals: 1: crystalline production structure, 2: sintering structure, 3: jet-printing structure, 4: bottom support frame, 5: spring buffer frame, 6: hinge connection rod, 7: fixation-connection bracket, 8: first conveying bed-plate frame, 9: coating rolling rod, 10: electric motor, 11: fixation-support frame, 12: communicating groove pipe frame, 13: side vertical hinge frame, 14: first electrical communicating frame, 15: second electrical communicating frame, 16: first protective insulating frame, 17: first electric heat-connecting seat, 18: sintering plate frame, 19: second electric heat-connecting seat, 20: second protective insulating frame, 21: third electrical communicating frame, 22: fourth electrical communicating frame, 23: communicating nozzle, 24: matching connecting pipe, 25: second conveying bed-plate frame, 26: connecting riser pipe, 27: spraying nozzle, 28: supporting leg plate, 29: mobile carriage, 30: fixation-connection member, 31: matching strut, and 32: tensile spindle.

DETAILED DESCRIPTION OF THE EMBODIMENTS

To enable those skilled in the art to well understand the solutions of the present disclosure, the technical solutions in the embodiments of the present disclosure will be clearly and completely described below in conjunction with the accompanying drawings in the embodiments of the present disclosure. Apparently, the described embodiments are only some rather than all of the embodiments of the present disclosure. All other embodiments obtained by those of ordinary skill in the art based on the embodiments of the present disclosure without creative efforts should fall within the protection scope of the present disclosure.

It should be noted that the terms "first", "second", or the like in the description and claims of the present disclosure and in the above accompanying drawings are intended to distinguish between similar objects, but do not necessarily indicate a specific order or sequence. It should be understood that data used in such a way can be interchangeable in proper circumstances to facilitate the embodiments of the present disclosure described herein. Moreover, the terms "include", "comprise", and any other variants mean to cover the non-exclusive inclusion. For example, a process, method, system, product, or device that includes a list of steps or units is not necessarily limited to those steps or units which are clearly listed, but may include other steps or units which are not expressly listed or inherent to such a process, method, system, product, or device.

The present disclosure is further described with reference to the accompanying drawings.

Example 1

A quantum dot light diffusion plate capable of blocking harmful blue light was provided. As shown in FIG. 1, a production process of the quantum dot light diffusion plate capable of blocking harmful blue light included the following steps:

In S1, fumed silica particles, titanium dioxide particles, and large-particle-size silica particles were added and stirred at a high speed for 20 min to obtain a particle-predispersed solution, red and green quantum dots were added to the particle-predispersed solution and stirred at a high speed for 30 min to obtain a quantum dot coating solution.

In S2, the quantum dot coating solution was coated on a surface of a light diffusion plate by an automatic coating machine, and then allowed to undergo spontaneous crystallization to form a light diffusion layer.

In S3, the light diffusion layer was sintered to obtain a quantum dot light diffusion plate.

In S4, an anti-blue light layer was jet-printed on a surface of the quantum dot light diffusion plate by an air jet printing machine.

In S5, after the jet-printing was completed, cooling and cutting were conducted to obtain the quantum dot light diffusion plate capable of blocking the harmful blue light.

In the S1, the quantum dot coating solution included the following components in parts by weight: 80 parts of the adhesive, 3 parts of the red quantum dots, 7 parts of the green quantum dots, 5 parts of the fumed silica particles, 7 parts of the titanium dioxide particles, and 18 parts of the large-particle-size silica particles. The adhesive was an acrylic acid adhesive. A particle size of the fumed silica particles was 10 nm to 30 nm. A particle size of the silica particles was 30 nm to 100 nm. A particle size of the large-particle-size silica particles was 100 nm to 200 nm. The anti-blue light layer in the S3 included the following components in parts by weight: 30 parts of a UV-cured polycarbonate, 15 parts of a nano-rare earth oxide, 10 parts of polymethyl methacrylate, 9 parts of n-hexanol, 4 parts of 2,6-di-tert-butyl-4-methylphenol, 7 parts of dimethyl oxalate, and 1 part of zinc oxide.

Example 2

A quantum dot light diffusion plate capable of blocking harmful blue light was provided. As shown in FIG. 1, a production process of the quantum dot light diffusion plate capable of blocking harmful blue light included the following steps:

In S1, fumed silica particles, titanium dioxide particles, and large-particle-size silica particles were added and stirred at a high speed for 25 min to obtain a particle-predispersed solution, red and green quantum dots were added to the particle-predispersed solution and stirred at a high speed for 25 min to obtain a quantum dot coating solution.

In S2, the quantum dot coating solution was coated on a surface of a light diffusion plate by an automatic coating machine, and then allowed to undergo spontaneous crystallization to form a light diffusion layer.

In S3, the light diffusion layer was sintered to obtain a quantum dot light diffusion plate.

In S4, an anti-blue light layer was jet-printed on a surface of the quantum dot light diffusion plate by an air jet printing machine.

In S5, after the jet-printing was completed, cooling and cutting were conducted to obtain the quantum dot light diffusion plate capable of blocking the harmful blue light.

In the S1, the quantum dot coating solution included the following components in parts by weight: 90 parts of the adhesive, 4 parts of the red quantum dots, 8 parts of the green quantum dots, 4 parts of the fumed silica particles, 7 parts of the titanium dioxide particles, and 15 parts of the large-particle-size silica particles. The adhesive was an acrylic acid adhesive. A particle size of the fumed silica particles was 10 nm to 30 nm. A particle size of the silica particles was 30 nm to 100 nm. A particle size of the large-particle-size silica particles was 100 nm to 200 nm. The anti-blue light layer in the S3 included the following components in parts by weight: 35 parts of a UV-cured polycarbonate, 17 parts of a nano-rare earth oxide, 12 parts of polymethyl methacrylate, 8 parts of n-hexanol, 5 parts of 2,6-di-tert-butyl-4-methylphenol, 6 parts to 8 parts of dimethyl oxalate, and 2 parts of zinc oxide.

Example 3

A quantum dot light diffusion plate capable of blocking harmful blue light was provided. As shown in FIG. 1, a production process of the quantum dot light diffusion plate capable of blocking harmful blue light included the following steps:

In S1, fumed silica particles, titanium dioxide particles, and large-particle-size silica particles were added and stirred at a high speed for 30 min to obtain a particle-predispersed solution, red and green quantum dots were added to the particle-predispersed solution and stirred at a high speed for 30 min to obtain a quantum dot coating solution.

In S2, the quantum dot coating solution was coated on a surface of a light diffusion plate by an automatic coating machine, and then allowed to undergo spontaneous crystallization to form a light diffusion layer.

In S3, the light diffusion layer was sintered to obtain a quantum dot light diffusion plate.

In S4, an anti-blue light layer was jet-printed on a surface of the quantum dot light diffusion plate by an air jet printing machine.

In S5, after the jet-printing was completed, cooling and cutting were conducted to obtain the quantum dot light diffusion plate capable of blocking the harmful blue light.

In the S1, the quantum dot coating solution included the following components in parts by weight: 100 parts of the adhesive, 4 parts of the red quantum dots, 9 parts of the green quantum dots, 4 parts of the fumed silica particles, 7 parts of the titanium dioxide particles, and 19 parts of the large-particle-size silica particles. The adhesive was an acrylic acid adhesive. A particle size of the fumed silica particles was 10 nm to 30 nm. A particle size of the silica particles was 30 nm to 100 nm. A particle size of the large-particle-size silica particles was 100 nm to 200 nm. The anti-blue light layer in the S3 included the following components in parts by weight: 40 parts of a UV-cured polycarbonate, 20 parts of a nano-rare earth oxide, 20 parts of polymethyl methacrylate, 8 parts of n-hexanol, 3 parts of 2,6-di-tert-butyl-4-methylphenol, 6 parts of dimethyl oxalate, and 1 part of zinc oxide.

According to Examples 1 to 3: In the present disclosure, quantum dots are added on the basis of a light diffusion plate, which can effectively improve a color gamut and a display effect. In addition, an anti-blue light layer is jet-printed on a surface of a quantum dot light diffusion plate. The anti-blue light layer can absorb most of harmful blue light to greatly reduce the emission of harmful blue light and improve the light stability and light display uniformity, which is suitable for the field of liquid crystal display. The production process of the present disclosure is simple and easy to operate, and has a high production efficiency and a prominent economic benefit.

Example 4

Figure 3:
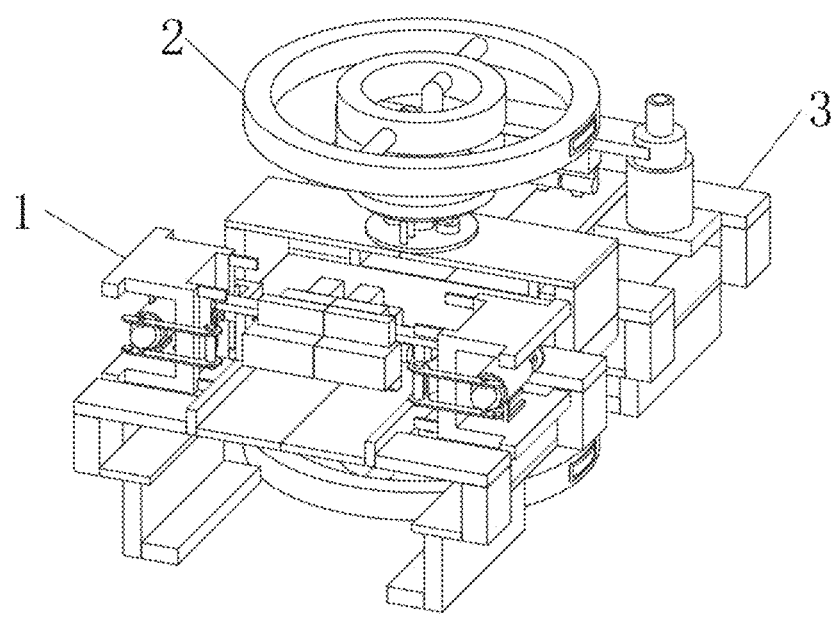
FIG. 3 is a side view of the main body of the present disclosure.
Figure 4:
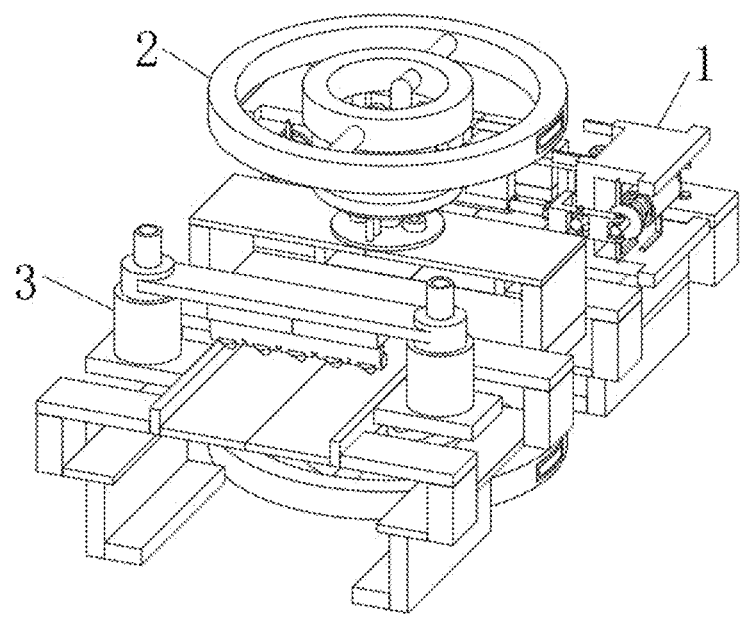
FIG. 4 is a rear view of the main body of the present disclosure.

As shown in FIG. 2, FIG. 3, and FIG. 4, the present disclosure provides the following example: A production device of a quantum dot light diffusion plate capable of blocking harmful blue light is provided, including a crystalline production structure 1, a sintering structure 2, and a jet-printing structure 3. A side edge of the crystalline production structure 1 communicates with the sintering structure 2, and a side edge of the sintering structure 2 communicates with the jet-printing structure 3. The arrangement of the above structures allows the integral connection and facilitates a production work.

Figure 5:
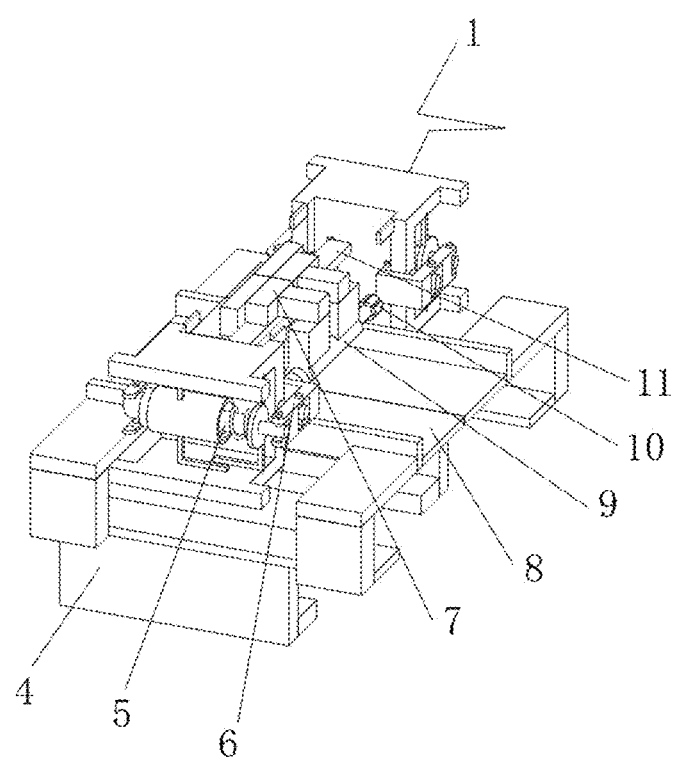
FIG. 5 is a schematic structural diagram of the crystalline production structure of the present disclosure.

As shown in FIG. 5, the crystalline production structure 1 includes a bottom support frame 4, a spring buffer frame 5, a hinge connection rod 6, a fixation-connection bracket 7, a first conveying bed-plate frame 8, a coating rolling rod 9, an electric motor 10, and a fixation-support frame 11. The arrangement of the above structures facilitates the assembly and contributes to the crystallization of a surface.

The bottom support frame 4 is arranged at an inner bottom of the crystalline production structure 1. A top of the bottom support frame 4 is fixedly connected to the first conveying bed-plate frame 8, a side edge of the first conveying bed-plate frame 8 is fixedly connected to the spring buffer frame 5. A side edge of the spring buffer frame 5 is fixedly connected to the hinge connection rod 6. A side edge of the hinge connection rod 6 is fixedly connected to the fixation-connection bracket 7. The electric motor 10 is arranged at a lower side edge of the fixation-connection bracket 7. A side edge of the electric motor 10 is fixedly connected to the coating rolling rod 9. The fixation-support frame 11 is fixedly connected to a bottom of the fixation-connection bracket 7.

Figure 6:
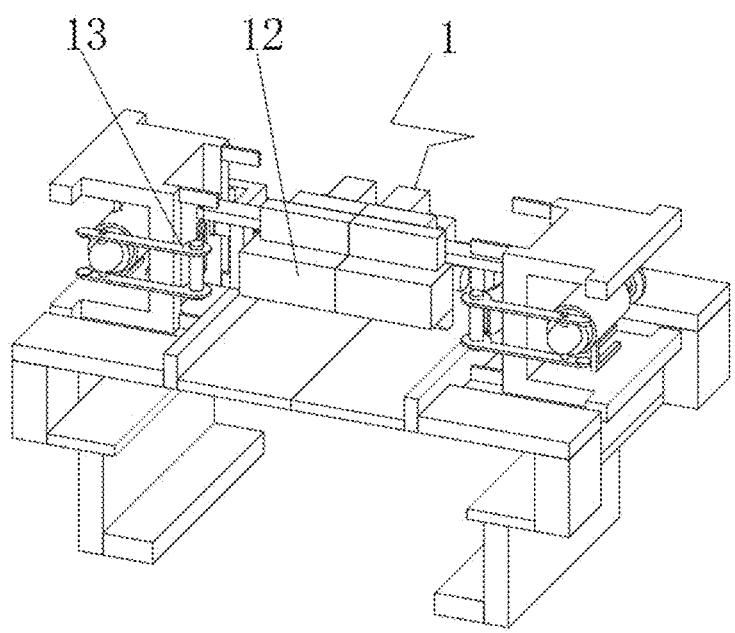
FIG. 6 is a side view of the crystalline production structure of the present disclosure.

As shown in FIG. 6, the crystalline production structure 1 includes a communicating groove pipe frame 12 and a side vertical hinge frame 13. The arrangement of the communicating groove pipe frame 12 and the side vertical hinge frame 13 facilitates the detailed treatment.

The communicating groove pipe frame 12 is arranged at an inner center of the crystalline production structure 1, and a side edge of the communicating groove pipe frame 12 is fixedly connected to the side vertical hinge frame 13.

Figure 7:
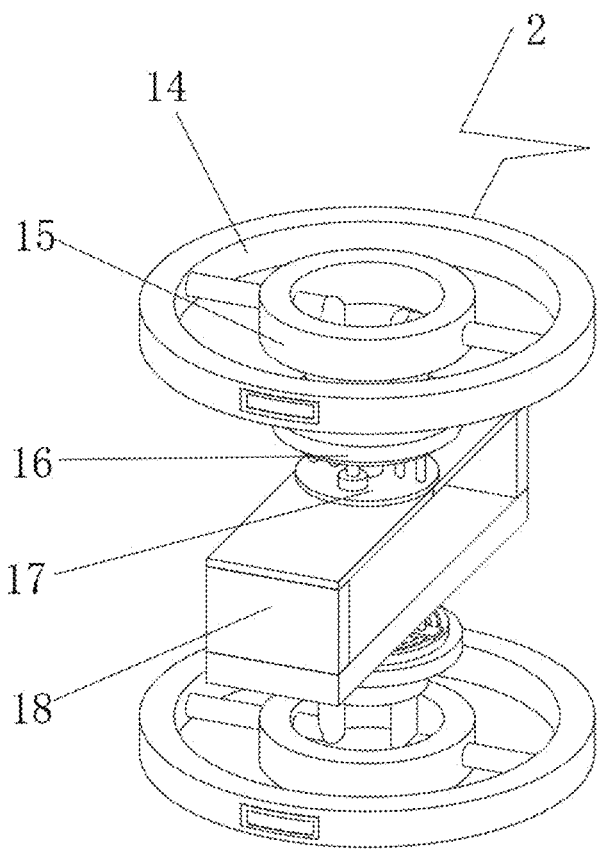
FIG. 7 is a schematic structural diagram of the sintering structure of the present disclosure.

As shown in FIG. 7, the sintering structure 2 includes a first electrical communicating frame 14, a second electrical communicating frame 15, a first protective insulating frame 16, a first electric heat-connecting seat 17, and a sintering plate frame 18. The assembly of the first electrical communicating frame 14, the second electrical communicating frame 15, the first protective insulating frame 16, the first electric heat-connecting seat 17, and the sintering plate frame 18 facilitates a sintering work.

The first electrical communicating frame 14 is arranged at an inner top of the sintering structure 2. A center of the first electrical communicating frame 14 communicates with the second electrical communicating frame 15. A bottom of the second electrical communicating frame 15 communicates with the first electric heat-connecting seat 17. The first protective insulating frame 16 is arranged between the second electrical communicating frame 15 and the first electric heat-connecting seat 17. A bottom of the first electric heat-connecting seat 17 is fixedly connected to the sintering plate frame 18.

Figure 8:
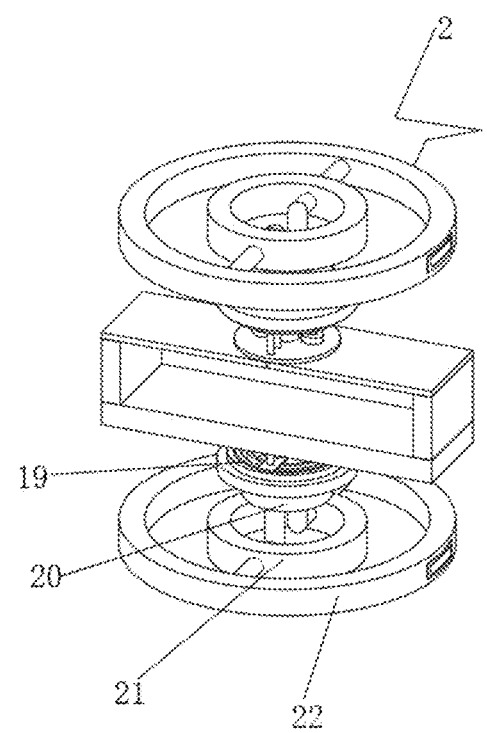
FIG. 8 is a side view of the sintering structure of the present disclosure.

As shown in FIG. 8, the sintering structure 2 further includes a second electric heat-connecting seat 19, a second protective insulating frame 20, a third electrical communicating frame 21, and a fourth electrical communicating frame 22. The fourth electrical communicating frame 22 is arranged at an inner bottom of the sintering structure 2. A center of the fourth electrical communicating frame 22 communicates with the third electrical communicating frame 21. A top of the third electrical communicating frame 21 communicates with the second electric heat-connecting seat 19. The second protective insulating frame 20 is arranged between the third electrical communicating frame 21 and the second electric heat-connecting seat 19. The combined arrangement of the second electric heat-connecting seat 19, the second protective insulating frame 20, the third electrical communicating frame 21, and the fourth electrical communicating frame 22 allows a sintering treatment and is conducive to a heating production work.

Figure 9:
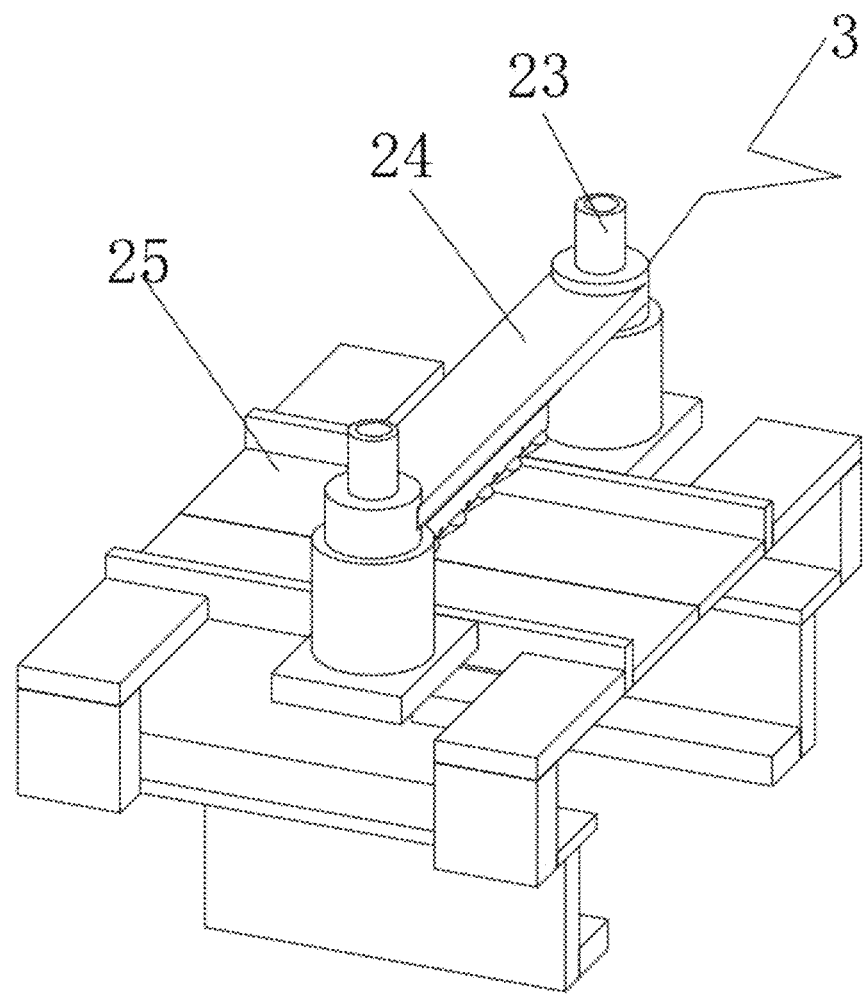
FIG. 9 is a schematic structural diagram of the jet-printing structure of the present disclosure.

As shown in FIG. 9, the jet-printing structure 3 includes a communicating nozzle 23, a matching connecting pipe 24, and a second conveying bed-plate frame 25. The arrangement of the jet-printing structure 3 allows a jet-printing production work, facilitates a combined connection, and is conducive to the overall production.

The second conveying bed-plate frame 25 is arranged at an inner center of the jet-printing structure 3. The communicating nozzle 23 is provided on the second conveying bed-plate frame 25. A center of the communicating nozzle 23 communicates with the matching connecting pipe 24.

Figure 10:
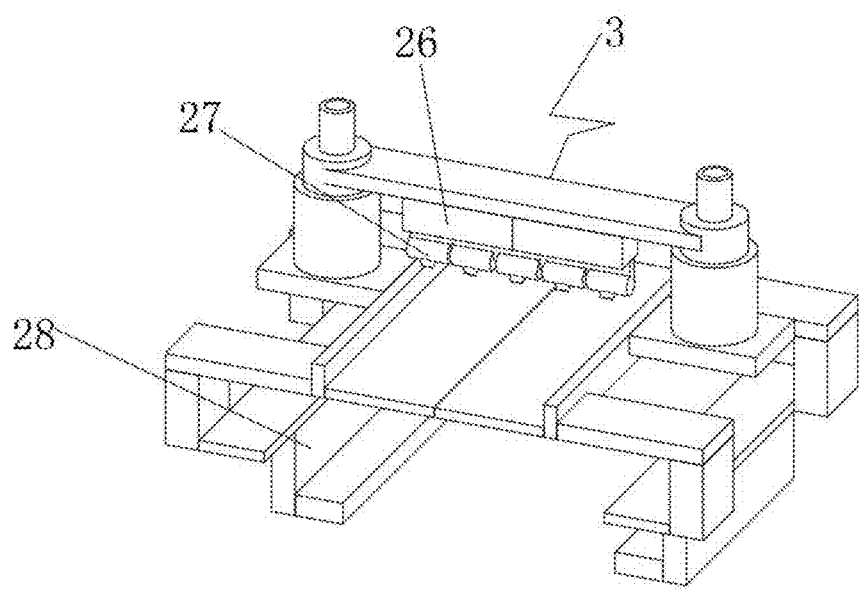
FIG. 10 is a side view of the jet-printing structure of the present disclosure.

As shown in FIG. 10, the jet-printing structure 3 further includes a connecting riser pipe 26, a spraying nozzle 27, and a supporting leg plate 28. The combined arrangement of the connecting riser pipe 26, the spraying nozzle 27, and the supporting leg plate 28 is convenient to a specific jet-printing production work.

The supporting leg plate 28 is fixedly connected to a bottom of the second conveying bed-plate frame 25. A bottom of the matching connecting pipe 24 communicates with the connecting riser pipe 26. A bottom of the connecting riser pipe 26 communicates with the spraying nozzle 27.

As shown in FIG. 1, FIG. 2, FIG. 3, FIG. 4, FIG. 5, FIG. 6, FIG. 7, FIG. 8, FIG. 9, and FIG. 10: The first electric heat-connecting seat 17 and the second electric heat-connecting seat 19 are arranged symmetrically, and both are fixedly connected to the sintering plate frame 18. The first electrical communicating frame 14 and the second electrical communicating frame 15 both have an annular structure, and the first electrical communicating frame 14 and the second electrical communicating frame 15 communicate with each other through a central inner cavity. The first conveying bed-plate frame 8 communicates with the sintering plate frame 18, and the sintering plate frame 18 communicates with the second conveying bed-plate frame 25. The communicating nozzle 23 communicates with an outside environment, and communicates with the connecting riser pipe 26 and the spraying nozzle 27 through the matching connecting pipe 24. The communicating groove pipe frame 12 communicates with the outside environment through a bottom position, and a bottom of the communicating groove pipe frame 12 is provided with a mouth body. The electric motor 10 is fixedly connected to the fixation-support frame 11, and the electric motor 10 is configured to drive the coating rolling rod 9 to be rotatably connected to the fixation-connection bracket 7. The arrangement of the above structures is convenient to the overall combined connection and the production control.

When this example is implemented, the crystalline production structure 1, the sintering structure 2, and the jet-printing structure 3 are assembled to allow the overall coordinated arrangement. The crystalline production structure 1 is produced through the assembly of the bottom support frame 4, the spring buffer frame 5, the hinge connection rod 6, the fixation-connection bracket 7, the first conveying bed-plate frame 8, the coating rolling rod 9, the electric motor 10, the fixation-support frame 11, the communicating groove pipe frame 12, and the side vertical hinge frame 13. A supporting work for a bottom is allowed through the bottom support frame 4. The first conveying bed-plate frame 8 is provided to facilitate a conveying work. The coating of a solution on a surface can be conducted through the communicating groove pipe frame 12. The electric motor 10 can drive the coating rolling rod 9 to rotate to allow the even coating, which is conducive to the overall coordinated production. The sintering structure 2 is produced through the assembly of the first electrical communicating frame 14, the second electrical communicating frame 15, the first protective insulating frame 16, the first electric heat-connecting seat 17, the sintering plate frame 18, the second electric heat-connecting seat 19, the second protective insulating frame 20, the third electrical communicating frame 21, and the fourth electrical communicating frame 22. A heating work can be conducted through the first electric heat-connecting seat 17 and the second electric heat-connecting seat 19 to allow a heating treatment work for a light diffusion plate inside the sintering plate frame 18 and thus allow a forming work for a surface. The first electrical communicating frame 14 and the second electrical communicating frame 15 can electrically communicate with each other, and the third electrical communicating frame 21 and the fourth electrical communicating frame 22 can electrically communicate with each other through bottoms. The communicating nozzle 23 in the jet-printing structure 3 communicates with the spraying nozzle 27 through the matching connecting pipe 24 and the connecting riser pipe 26, such that a surface of a light diffusion plate can be jet-printed.

Example 5

Figure 11:
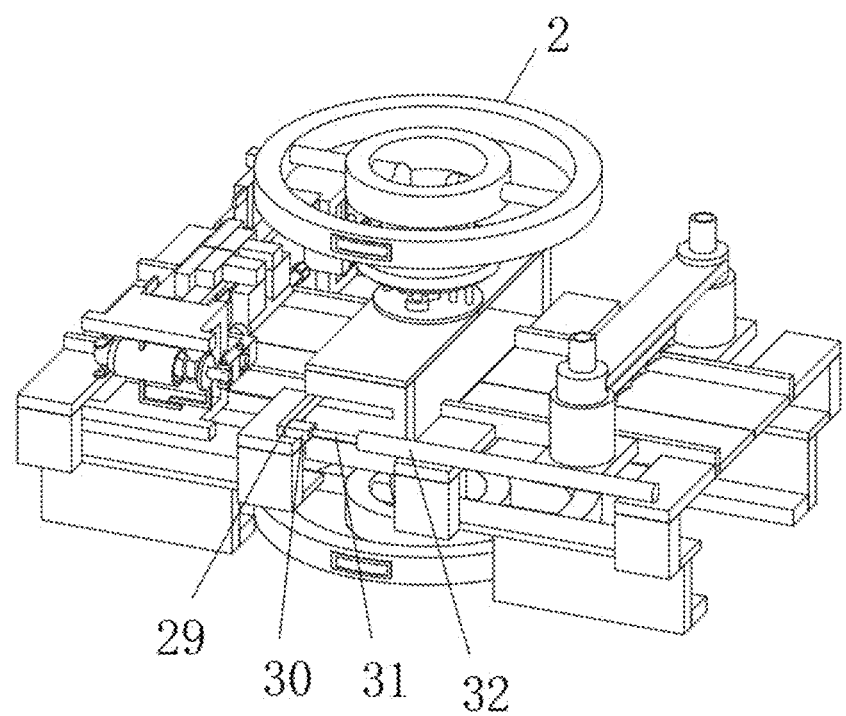
FIG. 11 is a schematic structural diagram of a second embodiment of the main body of the present disclosure.

On the basis of Example 4, as shown in FIG. 11, the side edge of the sintering structure 2 is slidably connected to a mobile carriage 29, a side edge of the mobile carriage 29 is fixedly connected to a fixation-connection member 30, a side edge of the fixation-connection member 30 is fixedly connected to a matching strut 31, and a side edge of the matching strut 31 is fixedly connected to a tensile spindle 32.

When this example is implemented, the mobile carriage 29, the fixation-connection member 30, the matching strut 31, and the tensile spindle 32 are arranged. The tensile spindle 32 can be connected to an outside environment and can be stretched through the outside environment to drive the matching strut 31, the fixation-connection member 30, and the mobile carriage 29 to move. The mobile carriage 29 is built in the sintering structure 2 at a center position, and can allow the passage of an internal light diffusion plate. In this way, the overall communicated treatment work of the crystalline production structure 1, the sintering structure 2, and the jet-printing structure 3 can be allowed.

Working principle: The crystalline production structure 1, the sintering structure 2, and the jet-printing structure 3 are connected and arranged by a user to allow the overall formation and arrangement work. A plate body is conveyed by a user through the first conveying bed-plate frame 8. The coating of a solution on a surface of the plate body can be conducted through the communicating groove pipe frame 12 on the fixation-connection bracket 7. The electric motor 10 can drive the coating rolling rod 9 to rotate, such that the coating rolling rod is directly connected to the plate body to allow the even coating on a surface, which is convenient to the subsequent production. The arrangement of the spring buffer frame 5 and the hinge connection rod 6 can allow a buffer work of a side part. The fixation-support frame 11 allows a supporting connection for the electric motor 10. The bottom support frame 4 allows the fixation of a bottom of the crystalline production structure 1. The side vertical hinge frame 13 facilitates the combined arrangement with the communicating groove pipe frame 12, thereby allowing the overall coordinated fixation. When the plate body arrives at a position of the sintering plate frame 18, the first electrical communicating frame 14, the second electrical communicating frame 15, the third electrical communicating frame 21, and the fourth electrical communicating frame 22 are allowed to communicate with each other to allow a heating treatment work of the first electric heat-connecting seat 17 and the second electric heat-connecting seat 19, which is convenient to the combined connection. When the plate body arrives at a position of the second conveying bed-plate frame 25, the communicating nozzle 23 and the matching connecting pipe 24 are allowed to communicate with an outside environment, and a surface of the plate body is jet-printed through the connecting riser pipe 26 and the spraying nozzle 27, thereby allowing a detailed jet-printing work.

Although the examples of the present disclosure have been illustrated and described, it should be understood that those of ordinary skill in the art may make various changes, modifications, replacements, and variations to the above examples without departing from the principle and spirit of the present disclosure, and the scope of the present disclosure is limited by the appended claims and legal equivalents thereof.

What is claimed is:

1. A production device for a quantum dot light diffusion plate capable of blocking harmful blue light, comprising a crystalline production structure (1), a sintering structure (2), and a jet-printing structure (3), wherein a side edge of the crystalline production structure (1) communicates with the sintering structure (2), and a side edge of the sintering structure (2) communicates with the jet-printing structure (3);

the crystalline production structure (1) comprises a bottom support frame (4), a spring buffer frame (5), a hinge connection rod (6), a fixation-connection bracket (7), a first conveying bed-plate frame (8), a coating rolling rod (9), an electric motor (10), and a fixation-support frame (11);

the bottom support frame (4) is arranged at an inner bottom of the crystalline production structure (1), a top of the bottom support frame (4) is fixedly connected to the first conveying bed-plate frame (8), a side edge of the first conveying bed-plate frame (8) is fixedly connected to the spring buffer frame (5), a side edge of the spring buffer frame (5) is fixedly connected to the hinge connection rod (6), a side edge of the hinge connection rod (6) is fixedly connected to the fixation-connection bracket (7), the electric motor (10) is arranged at a lower side edge of the fixation-connection bracket (7), a side edge of the electric motor (10) is fixedly connected to the coating rolling rod (9), and the fixation-support frame (11) is fixedly connected to a bottom of the fixation-connection bracket (7);

the crystalline production structure (1) comprises a communicating groove pipe frame (12) and a side vertical hinge frame (13);

the communicating groove pipe frame (12) is arranged at an inner center of the crystalline production structure (1), and a side edge of the communicating groove pipe frame (12) is fixedly connected to the side vertical hinge frame (13); in the crystalline production structure (1), coating the quantum dot coating solution on a surface of a light diffusion plate, and allowing spontaneous crystallization of the quantum dot coating solution to form a light diffusion layer;

the sintering structure (2) comprises a first electrical communicating frame (14), a second electrical communicating frame (15), a first protective insulating frame (16), a first electric heat-connecting seat (17), and a sintering plate frame (18);

the first electrical communicating frame (14) is arranged at an inner top of the sintering structure (2), a center of the first electrical communicating frame (14) communicates with the second electrical communicating frame (15), a bottom of the second electrical communicating frame (15) communicates with the first electric heat-connecting seat (17), the first protective insulating frame (16) is arranged between the second electrical communicating frame (15) and the first electric heat-connecting seat (17), and a bottom of the first electric heat-connecting seat (17) is fixedly connected to the sintering plate frame (18);

the sintering structure (2) further comprises a second electric heat-connecting seat (19), a second protective insulating frame (20), a third electrical communicating frame (21), and a fourth electrical communicating frame (22); the fourth electrical communicating frame (22) is arranged at an inner bottom of the sintering structure (2), a center of the fourth electrical communicating frame (22) communicates with the third electrical communicating frame (21), a top of the third electrical communicating frame (21) communicates with the second electric heat-connecting seat (19), and the second protective insulating frame (20) is arranged between the third electrical communicating frame (21) and the second electric heat-connecting seat (19); in the sintering structure (2), sintering the light diffusion layer to obtain a quantum dot light diffusion plate;

the jet-printing structure (3) comprises a communicating nozzle (23), a matching connecting pipe (24), and a second conveying bed-plate frame (25);

the second conveying bed-plate frame (25) is arranged at an inner center of the jet-printing structure (3), the communicating nozzle (23) is provided on the second conveying bed-plate frame (25), and a center of the communicating nozzle (23) communicates with the matching connecting pipe (24);

the jet-printing structure (3) further comprises a connecting riser pipe (26), a spraying nozzle (27), and a supporting leg plate (28); and the supporting leg plate (28) is fixedly connected to a bottom of the second conveying bed-plate frame (25), a bottom of the matching connecting pipe (24) communicates with the connecting riser pipe (26), and a bottom of the connecting riser pipe (26) communicates with the spraying nozzle (27); in the jet-printing structure (3), jet-printing an anti-blue light layer on a surface of the quantum dot light diffusion plate to obtain the quantum dot light diffusion plate capable of blocking the harmful blue light;

the crystalline production structure (1), the sintering structure (2), and the jet-printing structure (3) are connected and arranged, the light diffusion plate is conveyed through the first conveying bed-plate frame (8) to reach the communicating groove pipe frame 12 on the fixation-connection bracket 7, then the quantum dot coating solution is coated on the surface of the light diffusion plate by the coating rolling rod (9), so as to allow spontaneous crystallization of the quantum dot coating solution to form the light diffusion layer;

then the light diffusion plate with the light diffusion layer are conveyed to the sintering plate frame (18), the first electrical communicating frame (14), the second electrical communicating frame (15), a third electrical communicating frame (21), and a fourth electrical communicating frame (22) are connected and powered on for performing heating treatment to sinter the light diffusion layer with the light diffusion layer to obtain the quantum dot light diffusion plate; and then the quantum dot light diffusion plate is conveyed to arrive at a position of the second conveying bed-plate frame (25), and is communicated with an outside environment through the communicating nozzle (23) and the matching connecting pipe (24), and a surface of the anti-blue light layer is jet-printed on the quantum dot light diffusion plate through the connecting riser pipe (26) and the spraying nozzle (27) to obtain the quantum dot light diffusion plate capable of blocking the harmful blue light.

2. The production device according to claim 1, wherein the first electric heat-connecting seat (17) and the second electric heat-connecting seat (19) are arranged symmetrically, and both are fixedly connected to the sintering plate frame (18).

3. The production device according to claim 2, wherein the first electrical communicating frame (14) and the second electrical communicating frame (15) both have an annular structure, and the first electrical communicating frame (14) and the second electrical communicating frame (15) communicate with each other through a central inner cavity.

4. The production device according to claim 3, wherein the first conveying bed-plate frame (8) communicates with the sintering plate frame (18), and the sintering plate frame (18) communicates with the second conveying bed-plate frame (25).

5. The production device according to claim 4, wherein the communicating nozzle (23) communicates with an outside environment, and communicates with the connecting riser pipe (26) and the spraying nozzle (27) through the matching connecting pipe (24).

6. The production device according to claim 5, wherein the communicating groove pipe frame (12) communicates with the outside environment through a bottom position, and a bottom of the communicating groove pipe frame (12) is provided with a mouth body.

7. The production device according to claim 6, wherein the electric motor (10) is fixedly connected to the fixation-support frame (11), and the electric motor (10) is configured to drive the coating rolling rod (9) to be rotatably connected to the fixation-connection bracket (7).

8. The production device according to claim 7, wherein the side edge of the sintering structure (2) is slidably connected to a mobile carriage (29), a side edge of the mobile carriage (29) is fixedly connected to a fixation-connection member (30), a side edge of the fixation-connection member (30) is fixedly connected to a matching strut (31), and a side edge of the matching strut (31) is fixedly connected to a tensile spindle (32).

9. A production process of the quantum dot light diffusion plate using the production device for a quantum dot light diffusion plate capable of blocking harmful blue light according to claim 1, comprising the following steps:
   S1, adding fumed silica particles, titanium dioxide particles, and large-particle-size silica particles to an adhesive, stirring at a high speed for 20 min to 30 min to obtain a particle-predispersed solution, adding red and green quantum dots to the particle-predispersed solution, and stirring at a high speed for 20 min to 30 min to obtain a quantum dot coating solution; a particle size of the fumed silica particles is 10 nm to 30 nm, a particle size of the silica particles is 30 nm to 100 nm, and a particle size of the large-particle-size silica particles is 100 nm to 200 nm;
   S2, coating the quantum dot coating solution on a surface of a light diffusion plate by an automatic coating machine, and allowing spontaneous crystallization of the quantum dot coating solution to form a light diffusion layer;
   S3, sintering the light diffusion layer to obtain a quantum dot light diffusion plate;
   S4, jet-printing an anti-blue light layer on a surface of the quantum dot light diffusion plate by an air jet printing machine; and
   S5, after the jet-printing is completed, conducting cooling and cutting to obtain the quantum dot light diffusion plate capable of blocking the harmful blue light.

10. The production process of the quantum dot light diffusion plate according to claim 9, wherein the anti-blue light layer in the S3 comprises the following components in parts by weight: 30 parts to 40 parts of an ultraviolet (UV)-cured polycarbonate, 15 parts to 20 parts of a nano-rare earth oxide, 10 parts to 20 parts of polymethyl methacrylate, 8 parts to 10 parts of n-hexanol, 3 parts to 5 parts of 2,6-di-tert-butyl-4-methylphenol, 6 parts to 8 parts of dimethyl oxalate, and 1 part to 3 parts of zinc oxide.

* * * * *